(12) United States Patent
Campbell et al.

(10) Patent No.: US 9,180,524 B2
(45) Date of Patent: Nov. 10, 2015

(54) FLY-CUTTING HEAD, SYSTEM AND METHOD, AND TOOLING AND SHEETING PRODUCED THEREWITH

(75) Inventors: Alan B. Campbell, Santa Rosa, CA (US); Dale L. Ehnes, Cotati, CA (US); Daniel S. Wertz, Sebastopol, CA (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1146 days.

(21) Appl. No.: 11/834,393

(22) Filed: Aug. 6, 2007

(65) Prior Publication Data

US 2009/0038450 A1    Feb. 12, 2009

(51) Int. Cl.
  *B23B 29/12*   (2006.01)
  *B23C 3/04*    (2006.01)
  *B23C 3/02*    (2006.01)
  *B23C 3/28*    (2006.01)
  (Continued)

(52) U.S. Cl.
  CPC .............. *B23B 29/125* (2013.01); *B23B 3/26* (2013.01); *B23C 3/02* (2013.01); *B23C 3/04* (2013.01); *B23C 3/28* (2013.01); *B23C 3/34* (2013.01); *B23C 5/08* (2013.01); *B23B 2260/108* (2013.01); *B23C 2226/125* (2013.01); *B23C 2226/31* (2013.01); *B23C 2226/315* (2013.01); *Y10T 82/10* (2015.01); *Y10T 83/0515* (2015.04); *Y10T 407/2228* (2015.01); *Y10T 408/885* (2015.01); *Y10T 428/24479* (2015.01)

(58) Field of Classification Search
  CPC .............. B23C 3/02; B23C 3/28; B23C 3/34; B23C 5/08; B23C 2226/31; B23C 2226/315; B23B 3/22; B23B 3/26; B23B 3/065; B23B 29/125; B23B 5/09; B23B 2260/108; B23B 2220/126; B23B 2220/12; B23B 2770/54; B23Q 17/2266; B23Q 17/2275; Y10T 408/885; Y10T 83/0515; B12B 2260/725
  USPC ................ 82/1.11, 118, 1.5, 1.2; 83/304, 305
  See application file for complete search history.

(56) References Cited

U.S. PATENT DOCUMENTS 1,690,209 A * 11/1928 Smith .............................. 83/329
2,310,790 A    2/1943 Jungersen
(Continued)

FOREIGN PATENT DOCUMENTS

CH    650177 A5 *  7/1985  ................ B23B 3/24
CH    671187 A  *  8/1989  ............. B21D 28/00
(Continued)

OTHER PUBLICATIONS

Bamberg, E. et al.; "A Novel Micromilling Technology Based on Single-Point Tool Tip Geometry"; presented at American Society of Precision Engineering Conference held Oct. 15-19, 2007 in Dallas, Texas.
(Continued)

*Primary Examiner* — Clark F. Dexter
*Assistant Examiner* — Jennifer Swinney

(57) ABSTRACT

A fly-cutting system is disclosed, and in particular one that comprises a dynamically-controllable actuator for controlling the position, orientation, or both position and orientation of a cutting element carried by a fly-cutting head. In certain embodiments, the actuator can adjust the position or orientation of a cutting element, or both, hundreds or thousands of times per second, enabling precise control over the shape of features formed by the cutting element in a surface of a workpiece.

42 Claims, 7 Drawing Sheets

(51) Int. Cl.
    *B23B 3/26* (2006.01)
    *B23C 3/34* (2006.01)
    *B23C 5/08* (2006.01)

(56) References Cited

U.S. PATENT DOCUMENTS

| | | | |
|---|---|---|---|
| 2,379,093 A | 6/1945 | Massonneau | |
| 3,099,939 A * | 8/1963 | Haase et al. | 409/25 |
| 3,466,212 A | 9/1969 | Clayton et al. | |
| 3,587,385 A | 6/1971 | Orend | 90/11 |
| 3,644,049 A * | 2/1972 | Hahn et al. | 408/10 |
| 3,742,815 A | 7/1973 | Sukhov et al. | 90/11 |
| 4,141,278 A | 2/1979 | Lieser | 90/11 |
| 4,164,891 A | 8/1979 | Lieser | 409/165 |
| 4,369,007 A * | 1/1983 | Canady | 409/190 |
| 4,417,489 A * | 11/1983 | Liu | 82/1.11 |
| 4,883,392 A | 11/1989 | Lieser | 409/165 |
| 4,901,480 A * | 2/1990 | Dillon | 451/548 |
| 4,981,402 A * | 1/1991 | Krenzer et al. | 409/26 |
| 5,050,468 A * | 9/1991 | Nydigger | 82/1.11 |
| 5,175,030 A | 12/1992 | Lu et al. | 428/30 |
| 5,216,843 A | 6/1993 | Breivogel et al. | 81/131 |
| 5,257,882 A * | 11/1993 | Stadtfeld et al. | 409/26 |
| 5,351,589 A * | 10/1994 | Creaden | 83/678 |
| 5,360,270 A | 11/1994 | Appeldorn et al. | 383/5 |
| 5,540,128 A * | 7/1996 | Creaden | 83/305 |
| 5,695,305 A | 12/1997 | Heym | 409/228 |
| 5,713,253 A | 2/1998 | Date et al. | 82/1.11 |
| 5,720,210 A | 2/1998 | Okahashi | 83/342 |
| 5,874,155 A | 2/1999 | Gehrke et al. | |
| 5,899,645 A | 5/1999 | Garschagen et al. | 409/9 |
| 5,919,551 A | 7/1999 | Cobb, Jr. et al. | 428/156 |
| 5,961,260 A * | 10/1999 | Kasler et al. | 409/25 |
| 6,026,727 A * | 2/2000 | Meeks | 83/887 |
| 6,053,676 A | 4/2000 | Garschagen et al. | 409/31 |
| 6,129,801 A | 10/2000 | Benson et al. | |
| 6,322,236 B1 * | 11/2001 | Campbell et al. | 362/333 |
| 6,354,709 B1 | 3/2002 | Campbell et al. | 362/31 |
| 6,540,367 B1 | 4/2003 | Benson et al. | |
| 6,581,286 B2 | 6/2003 | Campbell et al. | 29/895 |
| 6,601,484 B1 | 8/2003 | Katoh et al. | 82/1.11 |
| 6,759,113 B1 | 7/2004 | Tang | 428/156 |
| 6,942,432 B2 | 9/2005 | Noggle et al. | |
| 7,199,930 B2 | 4/2007 | Yao et al. | |
| 7,317,501 B2 | 1/2008 | Tanaka et al. | |
| 7,614,326 B2 * | 11/2009 | Peltonen et al. | 82/1.11 |
| 7,793,403 B2 * | 9/2010 | Matsumoto | 29/558 |
| 7,849,769 B2 * | 12/2010 | Akiyama | 82/121 |
| 8,020,267 B2 * | 9/2011 | Akiyama | 29/40 |
| 2002/0014138 A1 * | 2/2002 | Yamazaki et al. | 82/1.11 |
| 2002/0170396 A1 * | 11/2002 | Maier | 82/1.11 |
| 2003/0221525 A1 * | 12/2003 | Katoh et al. | 82/121 |
| 2003/0223830 A1 | 12/2003 | Bryan et al. | 407/119 |
| 2004/0045419 A1 * | 3/2004 | Bryan et al. | 83/13 |
| 2004/0194596 A1 * | 10/2004 | Achelpohl | 83/304 |
| 2007/0062015 A1 * | 3/2007 | Krause et al. | 29/27 C |
| 2007/0084315 A1 | 4/2007 | Trice et al. | 82/1.11 |
| 2007/0084316 A1 | 4/2007 | Trice et al. | 82/1.11 |
| 2007/0144315 A1 | 6/2007 | Gardiner et al. | 82/1.11 |
| 2007/0251360 A1 | 11/2007 | Akiyama | |
| 2008/0055936 A1 | 3/2008 | Wilson et al. | |

FOREIGN PATENT DOCUMENTS

| | | |
|---|---|---|
| DE | 33 12 484 | 10/1983 |
| JP | 58 51010 | 3/1983 |
| JP | 6-115781 | 4/1984 |
| JP | H04256501 | 9/1992 |
| JP | 2002-036004 | 2/2002 |
| JP | 2004-223836 | 8/2004 |
| KR | 10-2005-0108454 | 11/2005 |
| KR | 2005108454 A * | 11/2005 |
| WO | WO 00/48037 A2 | 8/2000 |
| WO | WO 00/48037 A3 | 8/2000 |

OTHER PUBLICATIONS

Davies, M.A. et al.; "Application of precision diamond machining to the manufacture of micro-photonics components"; Proc. of SPIE vol. 5183; pp. 94-108; 2003.

"Designing with Piezoelectric Transducers: Nanopositioning Fundamentals"; Sep. 2005; Physik Instruments; pp. 4-1 to 4-49.

Slocum, A. H.; "Precision Machine Design"; 1992; Table of Contents and Chapters 1-3, 5-7, 9 and 10.

* cited by examiner

FLY-CUTTING HEAD, SYSTEM AND METHOD, AND TOOLING AND SHEETING PRODUCED THEREWITH

RELATED APPLICATION

This application is generally related to the subject matter of U.S. patent application Ser. No. 11/834,371, entitled "Fly-Cutting System and Method, and Related Tooling and Articles," now abandoned, which was commonly assigned to the assignee of the present invention, was filed on the same date as the present application, and is incorporated by reference herein.

TECHNICAL FIELD

A fly-cutting apparatus is disclosed of the type used to create grooves or similar features in a workpiece to form a microreplication tool, as well as a system and method for using such an apparatus, microreplication tools made thereby, and sheeting produced using a microreplication tool so made.

BACKGROUND OF THE INVENTION

Precision-engineered surfaces, such as polymeric optical films that include linear prisms or cube-corner prisms to control and direct light, are useful in a variety of applications. For example, cube-corner sheeting can be adapted to reflect light back toward its origin, which makes that retroreflective sheeting useful for road signs or vehicle license plates. Another type of film, having a microstructured adhesive layer to adhere the film to a surface, can be applied with fewer air pockets between the film and the surface, which results in improved appearance and performance.

One way to manufacture such a film is to engrave a metal roll to form a microreplication tool, and then to use that tool to form the film. For example, a molten polymer such as polyester may be extruded onto the microreplication tool and subsequently removed. The film then has one surface that exhibits the opposite structure of the pattern on the microreplication tool. If those patterns are designed appropriately, the film can be used for the purposes noted above, among other things.

U.S. Pat. No. 5,175,030 (Lu et al.) discloses a linear prism or linear groove film that has been used successfully for certain applications. That patent also discloses a microreplication tool or roll on which the linear groove film is produced. The surface of a roll of that type is created by cutting either a succession of adjacent individual grooves or, more commonly, by cutting a single helical groove (commonly referred to as a "thread cut"), into that surface. Although microreplication tools made that way tend to exhibit reasonably precise grooves, the time required to create the tool is considerable. For example, thread-cutting a steel roll using a conventional cutting tool may take weeks of continuous work. If the microreplication tool is used regularly for making film, it may even wear out or otherwise become unusable before a new microreplication tool has been created. As a result, faster methods have been proposed for creating a microreplication tool having linear grooves or other similar structures.

One tool-cutting technique is referred to as "fly-cutting," in which a diamond-tipped cutting tool is mounted on a rotatable hub. U.S. Patent Application Publication No. 2004/0045419 A1 (Bryan et al.) discloses a fly-cutting device of this type. As the hub is rotated, the cutting tool periodically cuts into the surface of the roll, leaving a groove that approximates an arc of a circle. Successive arcs may overlap each other both in the length-direction of the groove and in the transverse (or lateral) direction, and create grooves that have a scalloped appearance in longitudinal cross-section. These grooves create corresponding scalloped structures in or on a film that is created using the microreplication tool, which may be desirable depending on the desired properties of the film.

In view of these and other conventional tool-cutting devices and methods, it would be beneficial to provide a new fly-cutting head, system, and method that provides for the high-speed creation of a microreplication tool having grooves of a desired topography, and to provide a film or sheeting made using such a tool.

SUMMARY OF THE INVENTION

The present invention includes several different aspects or embodiments. One embodiment is of a fly-cutting head comprising a dynamically-controllable actuator for changing the position or orientation, or both, of a tool holder. For purposes of the present invention, an "actuator" includes a motive element that creates motion in response to a signal. The tool holder may hold for example a cutting element or tool, or a peening element, or any other device adapted to deform or remove material from a workpiece. The actuator may change the position of the tool holder (and therefore a cutting element) along an axis, or its orientation with respect to an axis. The actuator can change the position of the cutting element based on the rotational position of the fly-cutting head, or based on the position of the cutting element relative to a workpiece. In embodiments in which the cutting element extends radially with respect to the rotational axis of the head, the actuator may change the cutting radius of a cutting element relative to the rotational axis of the head. Because the tool holder may hold a cutting element, or itself include a cutting element, a reference to a "cutting element" being positioned and/or oriented should be understood to include the positioning and/or orientation of any associated tool holder.

The actuator can be a component of a fast-tool servo (FTS), which may be activated in response to an electrical signal. The actuator may change the position of the cutting element in a random manner, or in a pseudo-random manner (according to a repeated random profile, for example), or according to a predetermined profile. The predetermined profile can cause the cutting elements to form a feature or groove having certain desirable characteristics or properties, such as variations or the absence of variations along one or more axes. One example of a useful feature that may be formed in a workpiece is conventionally called a "flat-bottomed groove," which (in the case of a groove formed on a cylindrical roll having a diameter substantially larger than the depth of a groove) actually is not flat-bottomed, but is a groove having an essentially constant radius of curvature at the bottom of the groove relative to the roll, so that a sheeting or other film formed on that roll exhibits an essentially linear peak.

The fly-cutting head of the present invention may be used together with an encoder for detecting changes in the angular position of the head. The encoder may be adapted to transmit a signal indicative of the angular position of the head to a control system. The fly-cutting head may also be used together with a control system, or with both an encoder and a control system. The control system can, based on signals received from one or more encoders, send a signal to one or more actuators to control the actuator, and thus to control any associated cutting element. The actuator may effectuate macro-position control or micro-position control or both, as desired.

Various methods are also disclosed, including for example a method of forming features in a surface of a workpiece using a fly-cutting head. That method comprises the step of providing a fly-cutting head having a cutting element and an actuator for controlling the position or orientation of the cutting element relative to the head. The method may also include the step of controlling the position or orientation of the cutting element relative to the head based on the angular position of the cutting element relative to the workpiece. That step may comprise controlling the position of the cutting element in a manner that enables the cutting element to form an essentially flat-bottomed groove in the workpiece. It may also or instead comprise controlling the position of the cutting element in a manner that changes the effective cutting radius of the cutting element during at least part of the time that the cutting element is in contact with a workpiece.

In another embodiment of the inventive method, the workpiece is adapted for rotation about an axis of rotation, and the flycutting head is positioned with its axis of rotation at an angle with respect to the axis of rotation of the workpiece, as described below. The angle may be determined in some embodiments based on the rotational velocity of the workpiece, so that a feature cut into the workpiece while the workpiece is rotating is designed to take into account the rotation of the workpiece.

Finally, the invention includes within its scope a microreplication tool made by the methods described above, and polymeric sheeting produced using any such microreplication tool. Sheeting of that kind can be used in, for example, a display such as a computer display.

These and other aspects of the invention are described in greater detail below.

BRIEF DESCRIPTION OF THE DRAWINGS

The present invention will be described with reference to the attached Figures, in which.

DETAILED DESCRIPTION OF THE INVENTION

The present invention includes several embodiments, including fly-cutting heads or systems with certain dynamically controllable features such as control of the cutting radius, and other devices, systems, and methods as described in detail below. These devices, systems, and methods are useful in making microreplication tools also according to the present invention, and those tools can in turn be used to create microstructured surfaces such as microstructured polymeric sheeting, also according to the present invention.

Fly-cutting typically refers to the use of a cutting element, such as a diamond, that is mounted on or incorporated into a shank or tool holder that is positioned at the periphery of a rotatable head or hub, which is then positioned relative to the surface of the workpiece into which grooves or other features are to be machined. Fly-cutting is typically a discontinuous cutting operation, meaning that each cutting element is in contact with the workpiece for a period of time, and then is not in contact with the workpiece for a period of time during which the fly-cutting head is rotating that cutting element through the remaining portion of a circle until it again contacts the workpiece. Although a fly-cutting operation is typically discontinuous, the resulting groove segment or other surface feature formed in a workpiece by the fly-cutter may be continuous (formed by a succession of individual, but connected cuts, for example) or discontinuous (formed by disconnected cuts), as desired. Although the present invention is described most often in the context of removing material from a workpiece by fly-cutting using a cutting element, the present invention also includes within its scope the practice of peening or otherwise deforming a surface using a modified fly-cutting head equipped with peening elements rather than cutting elements.

Figure 1:
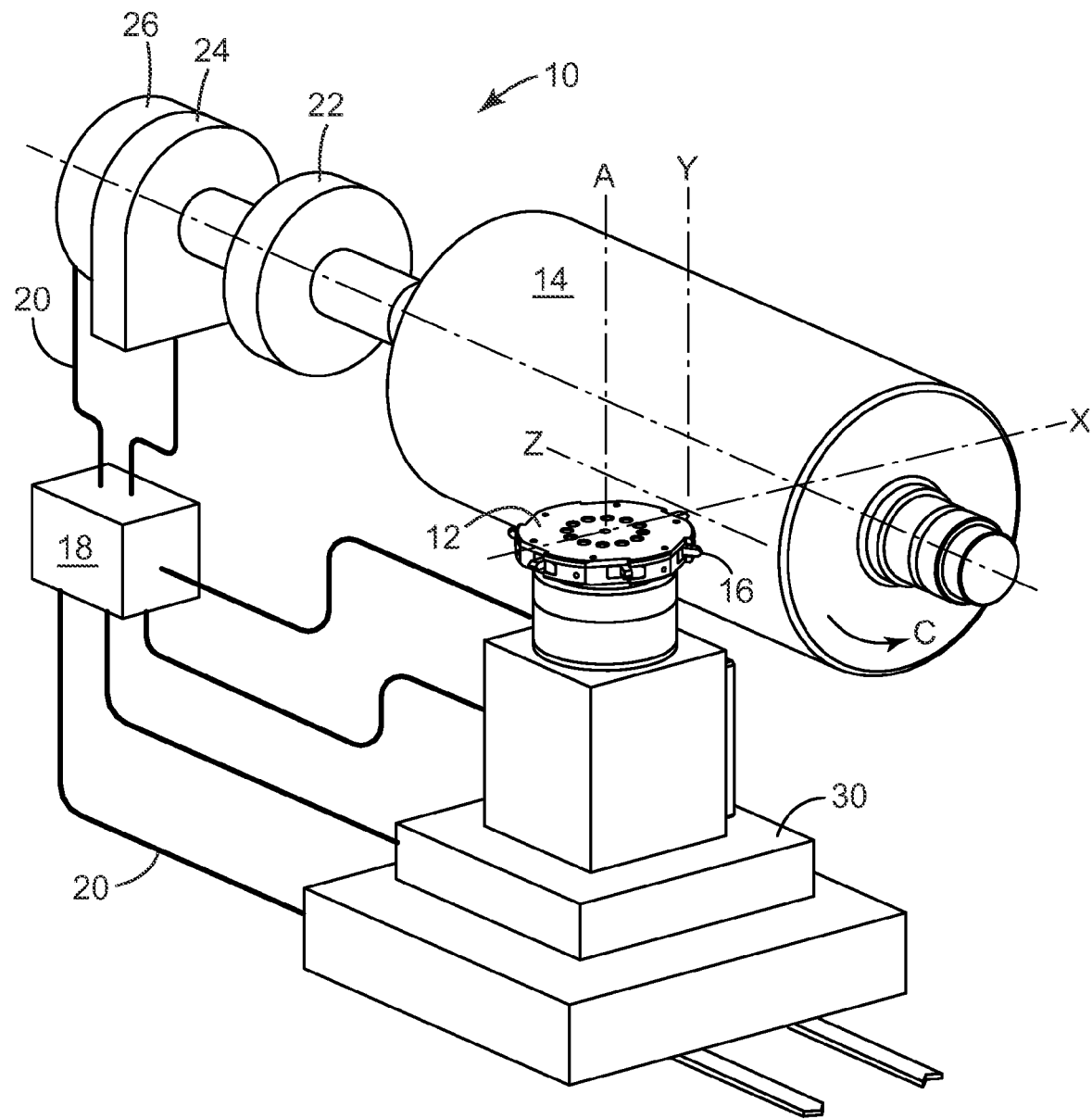
FIG. 1 is an illustration of a fly-cutting system according to the present invention.

FIG. 1 illustrates one embodiment of a fly-cutting system 10, including a fly-cutting head 12 positioned relative to a workpiece. FIG. 2A is an exploded view of a fly-cutting head according to the present invention, although the actuators and certain other features described below are not shown. The workpiece may be a roll 14 made of metal, such as stainless steel, with an outer layer made of a material that is more easily tooled, such as brass, aluminum, nickel phosphorus, hard copper, or polymer. For simplicity, the workpiece will often be referred to in this description as a "roll," but the workpiece could with suitable adaptations to the system be planar, convex, concave, or of a complex or other shape. Accordingly the term "roll" in this description is intended to exemplify workpieces of any suitable shape. The workpiece may include a test band at one end, on which the fly-cutting head can be programmed to cut a test pattern to determine whether the head and the workpiece are positioned and synchronized appropriately relative to each other. The characteristics of the features formed in the test band can then be evaluated, and once the operation of the fly-cutting head and the workpiece have been optimized, the actual machining operation can be performed on a different portion of the workpiece. Test bands are not required, but they may be useful for determining what adjustments may have to be made to cause the actual performance of the system to match the desired or theoretical performance of the system.

The fly-cutting head, in the illustrated embodiment, carries at least one tool holder 15, which holds or includes a cutting element 16. The cutting element may be a suitable industrial diamond selected to cut one or more grooves or other features in the outer surface of the roll, or another suitable cutting element such as a sharp metal point. Although the formations created in the workpiece by a cutting element may be referred to for simplicity herein as "grooves" or "groove segments," they may depending on their characteristics also be referred to as valleys, slots, indentations, scallops or, generically, "features."

A coordinate system may be designated, as shown in FIG. 1, with regard to the fly-cutting head 12 and workpiece 14. These coordinate system designations are arbitrary, and provided to facilitate an understanding of the present invention in the context of the drawings provided, rather than to limit the scope of the invention. The coordinate system is shown relative to the tip of the cutting element, and includes mutually orthogonal X, Y, and Z axes. The X axis is perpendicular to roll 14, and in the illustrated embodiment passes through the central axis of rotation of roll 14. The Y axis extends vertically, as shown in FIG. 1, and in the illustrated embodiment is parallel to or coincident with a tangent to the outer surface of the roll. The Z axis extends horizontally and parallel to the central axis of the roll. The workpiece, in the illustrated embodiment, also has a rotational axis C, and the workpiece may be rotated in either direction with respect to that axis. The fly-cutting head 12 has an axis of rotation A, which is parallel to the Y axis in FIG. 1. If the workpiece is planar (such as a plate or disc) rather than cylindrical, then corresponding adaptations in the preceding designations of the various axes may be made to facilitate an understanding of the invention in that context.

The fly-cutting system 10 can be used for high precision, high speed machining, and an overview of the system of the present invention will be provided first, followed by a detailed description of various components and their operations and uses.

FIG. 1 is a diagram of a fly-cutting system 10 according to one embodiment of the present invention. System 10 is controlled by a computer or controller 18, which may include or be operatively connected to memory for storing one or more applications, secondary storage for non-volatile storage of information, a function generator for generating waveform data files that can be output to an actuator or other device, an input device for receiving information or commands, a processor for executing applications stored in memory or secondary storage or received from another source, a display device for outputting a visual display of information, or an output device for outputting information in other forms such as speakers or a printer, or any combination of two or more of the foregoing. The controller may exchange data or signals using cables 20, or a suitable wireless connection.

The workpiece—roll 14 in the illustrated embodiments—may be fixedly supported on a spindle system that is driven by a motor that is controlled by and receives command signals from the controller. The spindle system may include one or more bearings 22, such as air or hydrostatic bearings. For simplicity, bearings 22 are shown at only one end of the roll in FIG. 1, and are not shown in FIG. 2, although they may be positioned and supported in any suitable location with respect to a workpiece. The roll may be rotated in either direction by a motor 24 or, if the workpiece is not cylindrical or is positioned using a different system, positioned in response to instructions provided by the controller 18. An exemplary motorized spindle system is available from Professional Instruments of Hopkins, Minn., under the designation 4R, or under the designation 10R (which includes an air bearing), or, for larger workpieces, a oil hydrostatic spindle system from Whitnon Spindle Division, Whitnon Manufacturing Company, of Farmington, Conn. The spindle system preferably also includes a rotary encoder 26 that is adapted to detect the position of the spindle and thus the workpiece to within a desired degree of accuracy, and to transmit that information to the controller to enable the controller to synchronize the workpiece and the fly-cutting head in the manner described below.

The fly-cutting head is preferably supported on a fly-cutting table 30, which may be referred to as an "x-table." The x-table is adapted for movement along at least one of the X, Y, and Z axes, preferably along both the X and Z axes as shown in FIG. 1, and more preferably along all three of the X, Y, and Z axes sequentially or preferably simultaneously, to position the fly-cutting head and the cutting element(s) relative to the workpiece. As is known in the art, the x-table can move in more than one dimension or direction essentially simultaneously, so that the location of the cutting tip can be easily positioned in three-dimensional space under the control of the controller.

Figure 3:
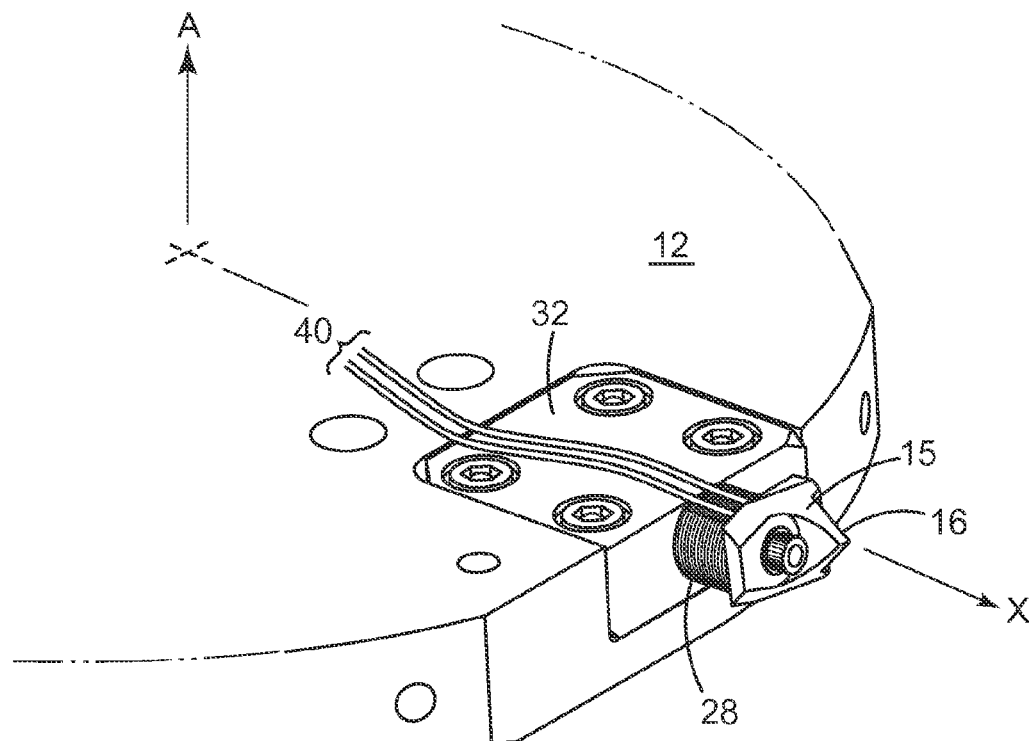
FIG. 3 is an illustration of a cutting element mounted on an actuator according to the present invention.
Figure 4:
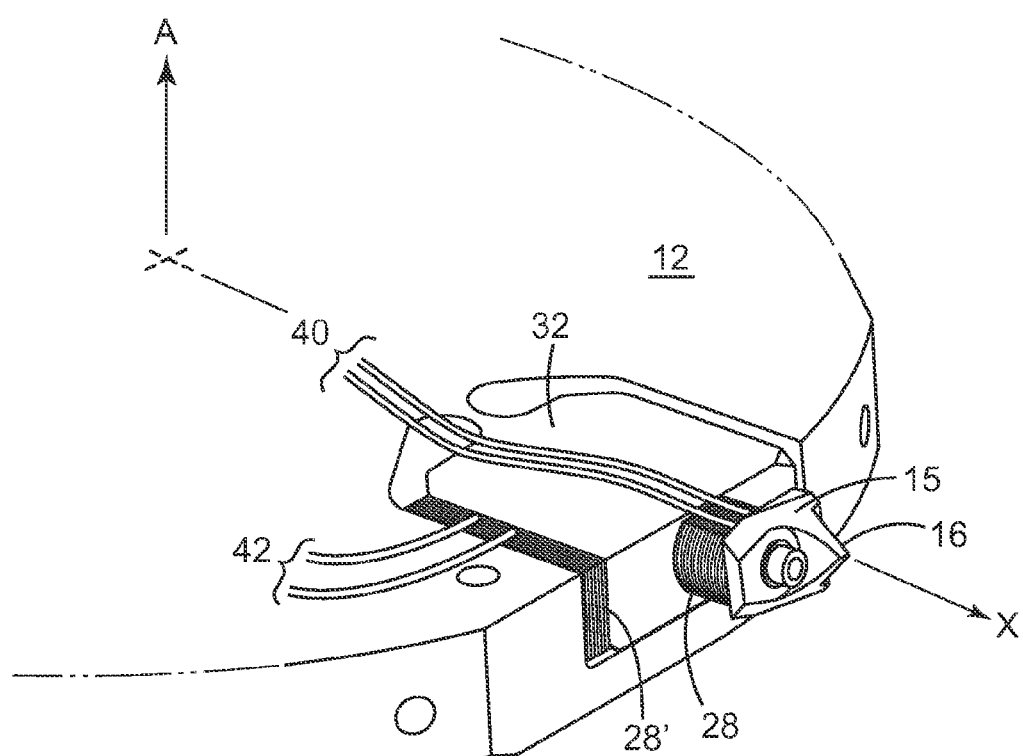
FIG. 4 is an illustration of a cutting element mounted on an actuator, in which the position of the cutting element and actuator can be further controlled by a second actuator.

An actuator 28 receives signals from the controller 18, and thereby controls the manner in which cutting element 16 creates features such as cuts or grooves in the workpiece. Actuator 28 is preferably removably connected to the fly-cutting head 12 either directly, or indirectly via a cartridge 32 or carrier. Although the actuator shown in FIG. 3 would extend the cutting element along the X axis only, actuators may be provided that would move a cutting element along any axis, or (rotationally) around any axis. FIG. 4, for example, includes a second actuator 28' that is adapted to change the position of the cutting element along a different axis than actuator 28. The arrangement shown in FIG. 4 may be modified so that the actuator 28' is repositioned to move the tool holder vertically (in the Figure), so that lateral movement of the tool holder and an associated cutting element during the cutting process is possible.

Other conventional machining techniques may useful in connection with the inventive system and its components. For example, cooling fluid may be used to control the temperature of the cutting elements, the fly-cutting head, the actuators, or other components. A temperature control unit may be provided to maintain a substantially constant temperature of the cooling fluid as it is circulated. The temperature control unit and a reservoir for cooling fluid can include pumps to circulate the fluid through or to the various components, and they also typically include a refrigeration system to remove heat from the fluid in order to maintain the fluid at a substantially constant temperature. Refrigeration and pump systems to circulate and provide temperature control of a fluid are known in the art. In certain embodiments, the cooling fluid can also be applied to the workpiece to maintain a substantially constant surface temperature while the workpiece is being machined. The cooling fluid can be an oil product, such as a low-viscosity oil.

Other aspects of the machining process are also known to persons of skill in the art. For example, a roll may be dry-cut, or cut using oil or another processing aid; high-speed actuators may require cooling; clean, dry air should be used with any air bearings, such as those that support the spindle; and the spindle may be cooled using an oil cooling jacket or the like. Machining systems of this type are typically adapted to account for a variety of parameters, such as the coordinated speeds of the components and the characteristics of the workpiece material, such as the specific energy for a given volume of metal to be machined, and the thermal stability and properties of the workpiece material. Finally, certain diamond-turning components and techniques of the type described in PCT Publication WO 00/48037, and fly-cutting components and techniques of the type described in U.S. Patent Publication 2004/0045419 A1 (Bryan et al., which is assigned to the assignee of the present invention), the contents of both of which are incorporated herein by reference, may also be useful in the context of the present invention.

The machining of a workpiece is preferably accomplished by coordinated movements of various components of the system described above. In order to provide grooves or other features at predetermined locations on a workpiece in accordance with the present invention, the position of each cutting element that is carried by the fly-cutting head should be coordinated or synchronized with the position of the workpiece. For example, where an aligned set of groove segments parallel to the Z axis is to be cut into a roll that will rotate while being machined, the control system preferably positions the cutting element of the fly-cutting head appropriately relative to the roll so that successive groove segments are in fact aligned.

In one embodiment, this synchronization may be done by providing a position encoder (such as an angular encoder) associated with the roll and another position encoder associated with the fly-cutting head. At least two types of encoders are currently available—incremental and absolute. Incremental encoders may be less expensive, and if used with an index signal that is indicative of a known position of the roll or the fly-cutting head, for example, may function effectively as an absolute encoder. The encoder 26 associated with the roll (or the spindle on which the roll is mounted) should have a resolution sufficient to detect the position of the roll along its axis of rotation to within a fraction of the desired groove pitch or other dimension of the features being machined into the roll. The groove pitch is the distance from the center of one groove to the center of the next adjacent groove, or the distance from one peak to the next adjacent peak, and a corresponding dimension can normally be calculated for other surface features. In one embodiment, the rotational position of the spindle, the rotational position of the fly-cutter head, and the z-axis position of the fly-cutter platform are all coordinated and controlled relative to each other. In another embodiment, the flycutter may be operated at a relatively constant angular velocity, and only the rotational position of the spindle and the z-axis position of the fly-cutter platform are controlled. In yet another embodiment, the rotational position of the roll, and the corresponding position of the fly-cutter head, are coordinated with (sometimes referred to as being "electronically geared to") each other, so that the positions of the two are always synchronized. Other synchronization methods may be used, as appropriate, for example to cut grooves or other features into a roll at an angle relative to the central axis of the roll. The positions and velocities of the various components can be controlled using, for example, numerical control techniques or a numerical controller (NC) implemented in software, firmware, or a combination in the controller.

In cases in which the workpiece is a cylindrical roll that is rotating around its longitudinal axis, a flycutting head that is arranged to cut a groove or succession of grooves parallel to that axis may need to be re-oriented so that the resulting groove or succession of grooves is actually parallel. In other words, if the cutting element would cut a parallel groove in the roll when the roll is stationary, then it would (if other parameters were held constant) cut a slightly curved groove in the roll if the roll is permitted to rotate during the cut. One way to offset this effect is to angle the cutting head so that the cutting element at the end of its cut is farther in the direction of rotation of the roll than at the beginning of its cut. Because the cutting element is in contact with the roll over only a short distance, the result can be to approximate a parallel groove segment in the roll surface notwithstanding the rotation of the roll. It may be possible to adapt the system in other ways to accomplish the same or a similar objective, for example by enabling the flycutting head to rotate around the central axis of the roll so that it follows the roll as it rotates, although this may be expensive to implement. In another embodiment, an actuator that changes the position of the cutting element in the Y direction could be used to alter the position of the cutting element vertically (in the illustrated arrangement).

Figure 2:
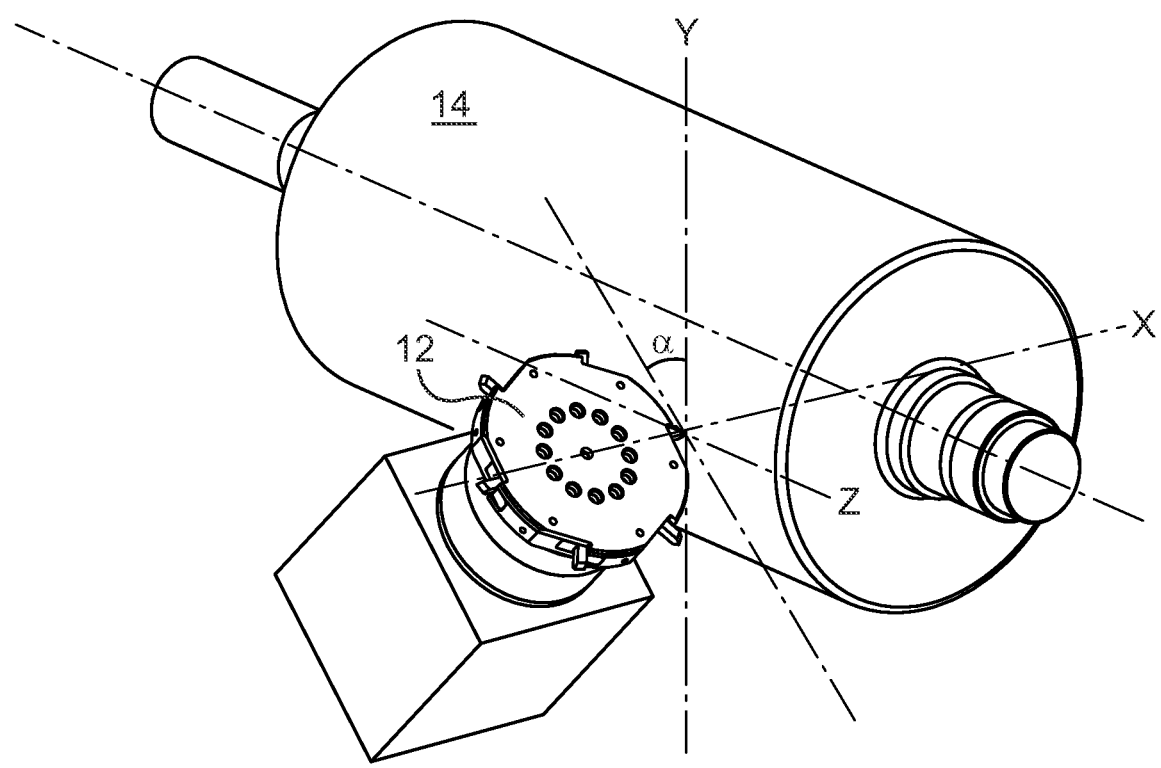
FIG. 2 is an illustration of fly-cutting system according to the present invention, with the fly-cutting head inclined at an angle relative to the axis of rotation of a workpiece.
Figure 2A:
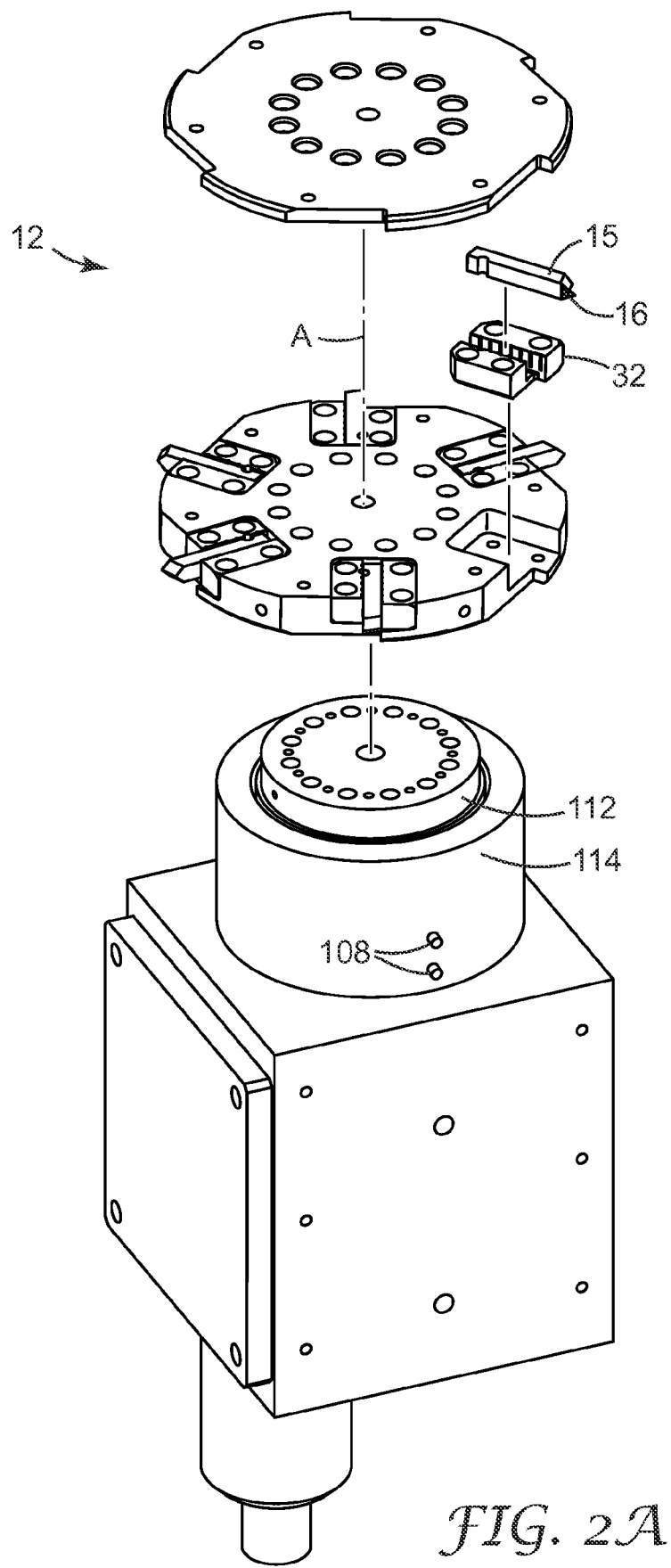
FIG. 2A is an exploded view of a fly-cutting head according to the present invention.

FIG. 2 illustrates an embodiment in which the fly-cutting head is arranged at an angle α relative to the Y axis, enabling it to form features in the workpiece at approximately a 45 degree angle relative to the longitudinal axis of the workpiece. The coordinate system in which the angle α is measured is arbitrary, and is not intended to limit the other positions or orientations at which the head can be positioned. The angle α can range from 0 to 360 degrees. In general, the fly-cutting head may be angled with respect to, or rotated around (or tilted with respect to), any axis.

The features of the present invention can be provided in connection with any suitable fly-cutting head. The fly-cutting head 12 shown in FIGS. 3 and 4 includes locations at which cutting elements can be secured to the head, including in one embodiment through the use of a cartridge 32 to which the cutting element may be secured. The head further includes an air bearing 114, which may include ports 108, and is coupled to a motor such as a DC motor that drives the head. A rotary encoder associated with the fly-cutting head senses the rotational position of the rotating shaft 112 that supports the head, which is useful because the position of the cutting elements can then be dynamically controlled in synchronization with their rotational position relative to the workpiece, as described herein. The other characteristics of the fly-cutting head can be selected as desired. For example, a larger diameter fly-cutting head can be used to create grooves that naturally have a flatter bottom, due to the larger cutting radius, than grooves cut by a smaller diameter fly-cutting head.

The cutting elements may be single or polycrystalline diamond, carbide, steel, cubic boron nitride (CBN), or of any other suitable material. Suitable diamond cutting tips are available from the K&Y Diamond Company of Quebec, Canada. The geometry of a cutting element such as a diamond, and the design of a shank or holder for the cutting element, may be specified to create the surface features or effects desired for a workpiece. The cutting element, which is typically replaceable, may include more than one cutting tip, or other features, as described for example in U.S. Patent Publication No. 2003/0223830 (Bryan et al.), the contents of which is incorporated by reference herein. Diamond cutting elements can be milled on a sub-micron scale, including for example by ion-milling, to create cutting elements that will form features of almost any desired configuration.

The cutting element 16 is preferably held by a cutting element cartridge or carrier 32, and the cutting element (either alone or together with a cartridge or carrier) is positioned or repositioned using an actuator. Although a cartridge may be useful in certain embodiments of the invention to facilitate the replacement and accurate positioning of the cutting element, it may be possible to mount a cutting element directly on an actuator without such a carrier, as shown in FIG. 3. The carrier, if used, may be made of one or more of the following materials: sintered carbide, silicon nitride, silicon carbide, steel, titanium, diamond, or synthetic diamond material. The material for cutting element carrier 32 preferably is stiff and has a low mass. The cutting element may be secured to the cutting element carrier by an adhesive, brazing, soldering, or in other ways, or directly to an actuator.

In order to control the position or orientation or both of one or more cutting elements carried by the fly-cutting head before, during, or after it is cutting a workpiece, at least one actuator 28 is provided. The actuator may be any device that effectuates a change in position or orientation of a cutting element, and may be a component of a fast tool servo (FTS). A fast tool servo typically includes a solid state piezoelectric ("PZT") device, referred to as a PZT stack, which can rapidly adjust the position of a cutting tool attached to the PZT stack. PZT stacks are available that have sub-nanometer positioning resolution, and they react very quickly and exhibit essentially no wear after millions or even billions of cycles. Actuators, such as those included in fast tool servos, may be used in closed loop operations, together with a position sensor that enables the actuator to adjust for positioning discrepancies, or in open loop operations with no position sensor.

In one embodiment of the present invention, the actuator is positioned between the fly-cutting head and the cutting element to position or orient the latter with respect to the former. In other embodiments more than one actuator is provided and associated with each cutting element, so that the position or orientation of the cutting element can be controlled in a corresponding number of directions or orientations, or both. For example, in FIG. 4 one actuator 28 changes the position of a cutting element along the X axis, and a second actuator 28' changes the position of a cutting element along the Z axis.

One actuator that has been shown to be useful is a PZT actuator such as the one available from the Kinetic Ceramics Company of Hayward, Calif. under the designation D1CN10, optionally with a hole drilled through the actuator to facilitate mounting. That actuator changes length in response to changes in an electrical signal, and has a maximum travel distance of approximately 9 micrometers and a resonant frequency of approximately 25 kHz (for the system, including the tool tip), or 90 kHz (for the piezo itself). A motion-amplified PZT actuator may also be useful when a longer travel distance is desired, as may a voice-coil actuator or a magneto-strictive actuator (such as one currently available from Etrema Products, Inc. of Ames, Iowa using material designated "Terfenol-D"), or other piezoelectric elements. The particular actuator(s) selected for an application depends on the displacement, frequency response, stiffness, and desired motion requirements of that application, such as rotational or bending motions.

In embodiments in which more than one cutting element is used together with the fly-cutting head, one, more than one, or all of the cutting elements may be used together with an actuator as described herein. For example, it may be useful to use a fly-cutting head having one fixed-position cutting element, and a second dynamically-controllable cutting element, so that the former tends to remove larger amounts of material from a workpiece and the latter tends to form specific features within or near the "pre-cut" formed by the fixed-position cutting element. Alternatively, in an embodiment of this type the "fixed-position" cutting element may be one that is dynamically-controllable by an actuator, but where the dynamic control feature is not used. In other words, the actuator could change the position of the cutting element, but the control system simply holds the cutting element at a fixed position. Also, a cutting element could be held in a constant position relative to the fly-cutting head during the time that the cutting element is in contact with a workpiece, and then its position or orientation or both could be changed during the time that the cutting element is not in contact with the workpiece.

The actuator may receive more than one signal or type of signal, through one or more wires, optical fibers, or other signal transmission devices. For example, the actuator may receive AC or DC power, to create the motive force necessary to change the position or orientation of the tool holder. The actuator may also receive a drive signal, which may be proportional to the change in position or orientation to be effectuated by the actuator. The actuator may receive a reference signal, such as a zero-voltage signal, that permits or causes it to return to its initial state, position, or orientation. Finally, the actuator or associated hardware may transmit feedback signals that provide information about the position or relative position of a tool holder or cutting element, for example, so that subsequent changes in the position or orientation of the tool holder or cutting element can be adapted appropriately. Signals of the type described, or other signals, can be transmitted through dedicated wires or optical fibers, or where appropriate they may be multiplexed along a single wire or optical fiber. The transmission of power and of the signals described herein, or any other necessary or useful signals, may also require the use of a slip ring or other mechanism for transferring signals from a stationary component to a rotating component, as is known in the art. One slip ring that may useful is available from Fabricast, Inc. of South El Monte, Calif., under the product number designation 09014. Other components for transferring power or signals, or both, include mercury wetted slip rings, fiber-optic rotary joints (FORJs), and contactless magnetic slip rings.

Another aspect of the present invention relates to compensation for the presence of a hysteresis effect associated with the actuator. The term "hysteresis effect," as used with respect to the present invention, means that the path that an actuator (and thus a tool holder and an associated cutting element or the like) travels in one direction may not be the same path that it travels in the opposite direction, although the beginning and end point is essentially the same. If this hysteresis effect is not compensated for, then the actual shape of a feature will not correspond to the predicated shape of a feature, which can be undesirable.

One method of overcoming a hysteresis effect in a system of the type described is to use a modified signal amplifier, such as a charge-control amplifier, to control charge to the actuator instead of voltage. This is believed to result in a 10× to 20× reduction in the hysteresis effect. Another method is to use a feedback system, such as one that includes a photonic probe, to detect the position or orientation of the actuator (or the tool holder or cutting element) in both directions of travel, and to use that information to control the signals send to the actuator to compensate for the hysteresis effect. These first two methods may be used together. A third method is to adapt the waveform of the signal that is directed to the actuator to compensate for a known hysteresis effect. For example, instead of transmitting a 5 volt signal to cause the actuator to extend the tool holder a known distance, and a 0 volt signal to cause the actuator to return to its original position (though by a different path, due to the hysteresis effect), those signals can be adapted so that the "outbound" and "return" paths are essentially the same. This method is believed to work well where the same feature is to be formed in a workpiece repetitively, because a single compensated waveform can be used repetitively, but not as well where successive features are different because the compensated waveform must be regenerated for each successive feature.

Signal or power transmission connections to the actuators are represented by lines 40 and 42, which as noted above could be for example wires or optical fibers, through which signals or power or both are transmitted from a controller to the actuator(s), and for example in the case of a feedback system, from the actuator to the controller. Due to the PZT effect and based upon the type of electric field applied, small and precise movements of the cutting element 16 can be created. Also, the end of the actuator 28 can be mounted against one or more Belleville washers, which provide for preloading of the actuator. The Belleville washers have some flexibility to permit movement of the actuator and a cutting element attached to it. If an actuator has multiple PZT stacks, it can use separate amplifiers to independently control each PZT stack for use in independently controlling movement of a cutting element attached to the stacks.

The actuator 28 is securely mounted to the flycutting head 12 either directly or, as shown in FIGS. 3 and 4, indirectly via cartridge 32. A secure connection is strongly preferred to provide the stability required for precise controlled movement of cutting element 16. The diamond on cutting element 16 in this example is a V-shaped symmetric diamond, although an offset 45 degree diamond with a vertical facet, or other types of diamonds may be used. For example, the cutting element can be an offset diamond, an asymmetric V-shaped diamond, or a round-nosed, flat, or a curved facet tool. The actuator may include ports for receiving a cooling fluid such as oil pumped from a reservoir, circulating it around the actuator, and delivering it back to the reservoir.

In certain embodiments of the present invention, the actuators selected for use are dynamically-controllable actuators. The term "dynamically-controllable" and its variations refer to the feature of the present invention that enables the position or orientation of the tool holder (and any associated cutting element) to be adjusted without stopping the fly-cutting head. In a preferred embodiment, the position or orientation, or both, of a tool holder (and any associated cutting element) may be changed during the time that the cutting element is cutting the workpiece, or may be changed during the time that the cutting element is not cutting the workpiece. For example, a dynamically-controllable fly-cutting head of the present invention can adjust the effective cutting path of the cutting elements when an actuator receives a signal, such as an electrical signal, that changes the effective length of the cutting element along, for example, the X axis. Dynamically-controllable fly-cutting heads may instead or in addition change the position of the cutting element(s) along other axes, or rotationally around one or more axes, or a combination of more than one of these. This is in contrast to other cutting heads that permit only static adjustment of the head to change the cutting profile, for example by using wrenches or other tools while the fly-cutting head is stopped.

Figure 6:
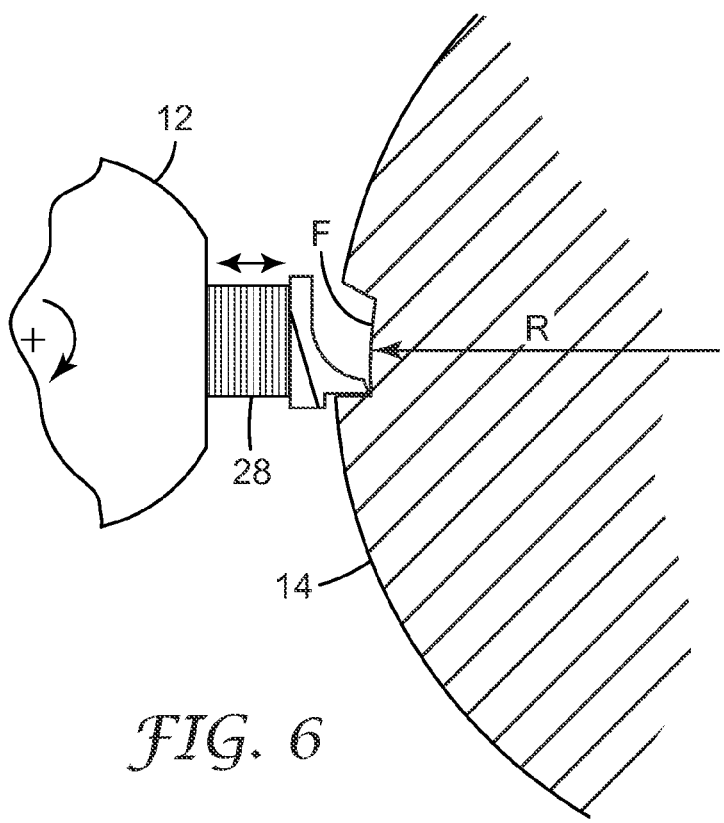
FIG. 6 is a cross-sectional view of a fly-cutting head and cutting element forming a flat-bottomed groove in a workpiece according to the present invention.

The actuator may be controlled using an open-loop control system, in which a set of computer numeric control (CNC) signals are fed to the actuator to control the actuator, or a closed-loop control system in which the position of the cutting element is detected during a rotation and the position information is used continuously to create or adjust the signal used to control the actuator. Actuators of the type described herein can execute sequential instructions (based on the signals it receives) at the rate of 10 kHz or even 50 kHz or more, and accordingly incremental adjustments in the cutting path can be made to provide surface features that exhibit very fine resolution, or features that have not in the past been readily created using a fly-cutting system. On the other hand, the actuators may be used to execute low-speed signals of 0 Hz (in the case of a fixed signal, in which the position and orientation of the cutting tip are not dynamically controlled) or more. For example, a fly-cutting head can, with this system, cut into a workpiece a groove segment having a bottom with an approximately constant radius of curvature relative to the workpiece, as shown in FIG. 6, by progressively reducing the cutting radius during a first portion of the cut, and then progressively increasing the cutting radius during a second portion of the cut.

Figure 5:
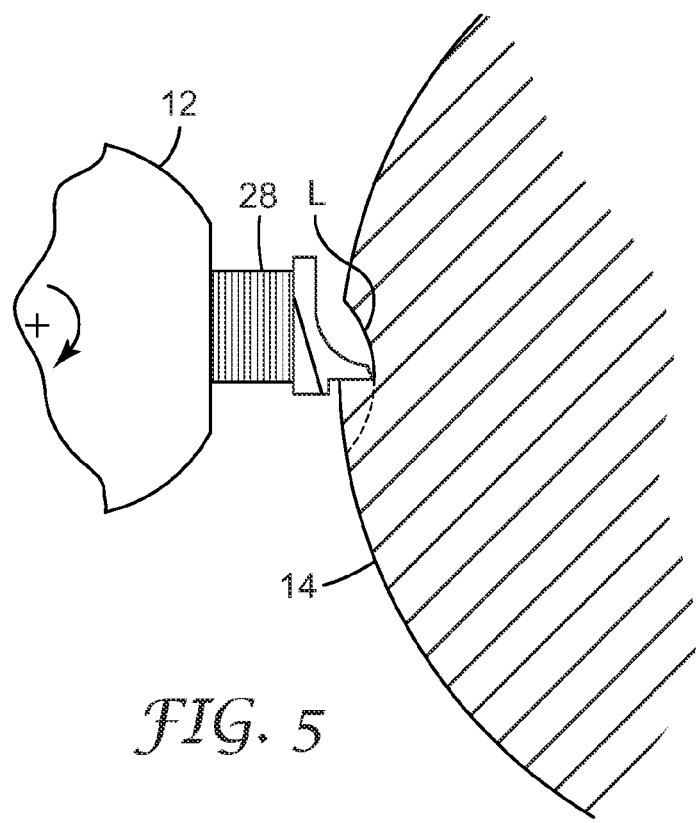
FIG. 5 is a cross-sectional view of a fly-cutting head and cutting element forming a groove in a workpiece.

In one embodiment, the fly-cutting head of the present invention includes a dynamically-controllable actuator that adjusts the cutting radius of the cutting element. In FIG. 5, the position of the cutting element 16 is not changed relative to the axis of rotation of the fly-cutting head, and accordingly the cutting element will have a cutting path indicated by line L that is curved. Note that FIGS. 5 and 6 are illustrations of a cutting element cutting a workpiece at a 90 degree angle relative to what is shown in FIG. 1. However, when dynamically-controllable actuator 28 is used as shown in FIG. 6 to change the position of the cutting element 16 during the time that the cutting element is cutting the workpiece, preferably as a function of the position of the cutting element relative to the workpiece, the cutting element will trace a controllable, predetermined cutting path. One desirable predetermined cutting path is one that yields a groove having a substantially linear or flat bottom, as shown at line F in FIG. 6, in contrast to the scalloped-bottom groove segments cut by conventional fixed-radius or non-dynamically adjustable fly-cutting devices.

Although several of the examples provided thus far relate to dynamic adjustments made along the X axis of the fly-cutting head—what may be referred to as "dynamic radius-controllable" fly-cutting, the scope of the invention is not limited to radius control. Just as an actuator can be provided to adjust the radial position of a cutting element relative to the axis of rotation of the fly-cutting head, an actuator can be provided to adjust the position of the cutting element relative to the fly-cutting head in other dimensions, whether along a Y or Z axes, rotationally, or any combination of the foregoing. For example, Z-axis control of the cutting element(s) may provide tools suitable for producing sheeting having a reduced tendency to exhibit Moire' effects, because of the absence of regular, linear grooves. Rotational control of a cutting element may be useful if the cutting element is not symmetrical, as a way of producing certain desirable features in the workpiece, or, if the cutting element is symmetrical, as a way of creating more even wear patterns on the tool tip, for example.

The system may include one or more encoders, which are used not only for purposes of measuring speed as with some conventional encoders used with fly-cutting systems, but to measure position. This assists in synchronizing the positions of the workpiece and the cutting element(s) of the fly-cutting head. Specifically, encoders may be provided to determine the rotational position of a roll, the position of the fly-cutting head with respect to its axis of rotation of the head, the position of the fly-cutter head with respect to another axis such as the Z axis, and the position of an x-table that moves the fly-cutter with respect to the roll.

One encoder useful in connection with the flycutting head in certain embodiments of the present invention is available from the Heidenhain Company of Germany under the designation ERO-1382, 1024 line count, and it is positioned on the flycutting head to measure the angular position of the head. An encoder that is useful in connection with the workpiece or roll in certain embodiments of the present invention is available from Renishaw Inc. of Hoffman Estates, Ill., under the designation Renishaw Signum RESM, 413 mm diameter, 64,800 line count. The particular encoder(s) selected for an application depends on the desired resolution, maximum speed of the fly-cutting head or other component, and the maximum signal speed.

A control system is also provided, as with conventional fly-cutting systems, but with regard to the present invention it also sends signals to the actuator(s) to control cutting performance, or receives encoder signals indicative of the relative position of the flycutting head and/or the workpiece, or synchronizes the position of the cutting head relative to the workpiece by sending signals to motors associated with the x-table, for example, or does more than one or all of these things. One useful control system includes input and output circuitry, and a PMAC control available from Delta Tau Data Systems of Chatsworth, Calif. That PMAC control combines a one or two axis PMAC2 controller with amplifiers to provide motion control of, for example, the flycutting head and the roll.

The control system of the present invention uses software or firmware or both that can be designed in a manner known to produce the results described herein. Specifically, the software preferably enables an operator to create waveform data files that represent both the micro-level shape of an individual groove segment or other surface feature, and a macro-level pattern (random, pseudo-random, or regular) of groove segments or other features on the workpiece. Those data files are then communicated to the various control system components to control the performance and preferably the synchronization of the cutting elements relative to the workpiece.

To program and coordinate the movement of the various components, software is typically used to input the desired parameters to create data files, and a wave generation unit then translates the data files into signals that are transmitted to the drive unit(s), actuator(s) and other components as required. For example, the roll speed may be set at from approximately 0.001 to approximately 1000 revolutions per minute, and the fly-cutting head speed may be set at from approximately 1000 to approximately 100,000 revolutions per minute. Fly-cutting head speeds of approximately 5000 revolutions per minute have been tested, and are generally preferred because higher speeds reduce the time required to create a finished workpiece, such as a microreplication tool.

The depth of the features cut into a workpiece surface may be in the range of 0 to 150 microns, or preferably 0 to 35 microns, or even more preferably for creating microreplication tools for optical films, 0 to 15 microns. These ranges are not intended to limit the scope of the invention, but they may represent the scale of features useful for providing certain optical effects in polymeric sheeting produced using such a tool. For a roll workpiece, the length of any individual feature is influenced by the speed at which the roll rotates around its longitudinal axis, because it is more difficult to form a long feature in a roll moving at a higher speed. If the cutting elements are moving in the opposite direction of the workpiece, longer grooves may generally be formed more easily than if the cutting elements are moving in the same direction as the workpiece. The feature can have almost any length, for example if the fly-cutting head of the present invention is used to create a feature approximating a thread cut around the perimeter of a cylindrical roll. If individual features are desired, their length may be from about 1 micron to several millimeters, for example, although this range is not intended to limit the scope of the present invention. For thread-cutting, the pitch or spacing between adjacent grooves can be set at from about 1 to about 1000 microns. The features can have any type of three-dimensional shape such as, for example, symmetrical, asymmetrical, prismatic, and semi-ellipsoidal features. In embodiments in which the material on the surface of a workpiece is indented or otherwise deformed instead of being removed, the deformation can be changed by changing the characteristics of the tool carried by the tool holder.

In another embodiment of the present invention, the dynamic-control actuation feature of the present invention is synchronized with the position of the workpiece to obtain certain particularly beneficial effects. That is, instead of activating the dynamically-controllable actuator according to a fixed set of instructions regardless of the position of the cutting element, the position of the cutting element is synchronized with the position of the roll. In one embodiment, the rotational position of a roll is coordinated (synchronized) with the Z axis position of the fly-cutting head, which varies within a predetermined range so as to produce groove segments in the roll that are non-linear, and the X-axis position of the cutting element(s) is or are coordinated with the rotational position of the fly-cutting head. The X-axis variation in the position of the cutting elements, which can be random, pseudo-random, or predetermined, can produce groove segments having depths (and possibly also widths) that vary, thereby producing a tool that would in turn form desired patterns on a piece of polymeric sheeting or other article prepared using the tool. The X-axis variation is normally important when the rotational position of the fly-cutting head positions the cutting element(s) to contact the workpiece or roll, and during the time the cutting element(s) contact(s) the roll that position may be varied by the control system and actuator(s) as desired. Because the actuator can be instructed to position the cutting element to create relatively long, flat-bottomed grooves, for example, this type of cutting system has the potential to enable an entire roll to be cut in a shorter period of time.

To form a microreplication tool according to the present invention, a workpiece such as a cylindrical roll is milled to provide the desired surface features. The blank roll may have an outer layer into which structures or patterns will be cut. That layer, after it has had a random or other pattern cut into it, may in turn be coated with one or more additional layers that protect the pattern, permit accurate formation of a film or its easy release, or perform other useful functions. For example, a thin layer of chrome or a similar material may be applied to the tool, although a layer of that type may "round over" sharp edges of the tool and therefore be undesirable. Any machineable materials could be used; for example, the workpiece can be made of aluminum, nickel, copper, brass, steel, or plastics (such as acrylics). The particular material to be used may depend, for example, upon a particular desired application such as various films made using the machined workpiece.

The roll and the fly-cutting head are positioned relative to each other, normally so that the cutting element(s) of the fly-cutting head contact(s) the roll at one side of the roll. The roll is typically mounted on a spindle that can be rotated at a desired rotational velocity, and the fly-cutting head is adapted to move relative to the roll in the manner described above. The cutting elements in certain embodiments of the present invention can be positioned by dynamically-controllable actuators that adjust the cutting elements in the X, Y, Z directions, rotationally, or any combination thereof.

Figure 7:
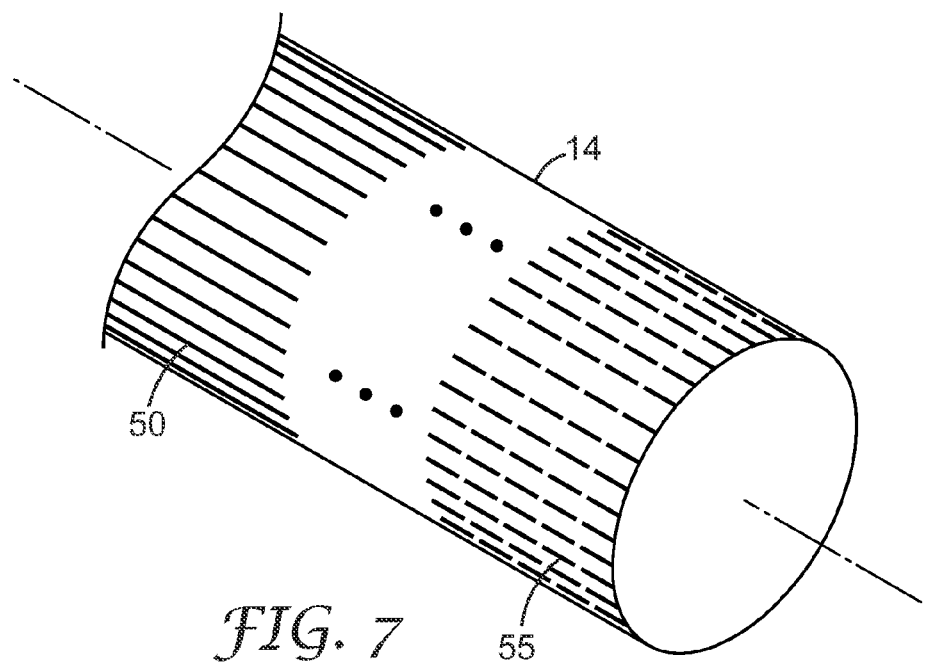
FIG. 7 is a perspective view of an exemplary microreplication tool having aligned individual grooves, and longitudinally-extending grooves, both in accordance with the present invention.
Figure 8A:
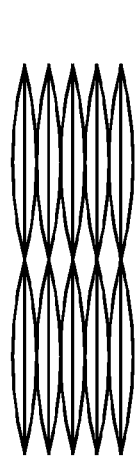
FIGS. 8A, 8B, 8C, and 8D are plan views of representative groove patterns formed according to the present invention.
Figure 8B:
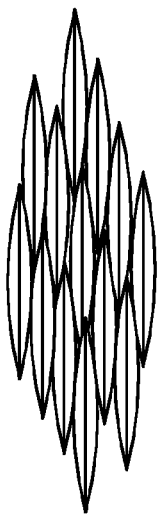
Figure 8C:
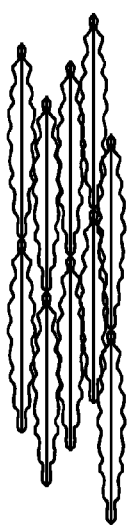
Figure 8D:
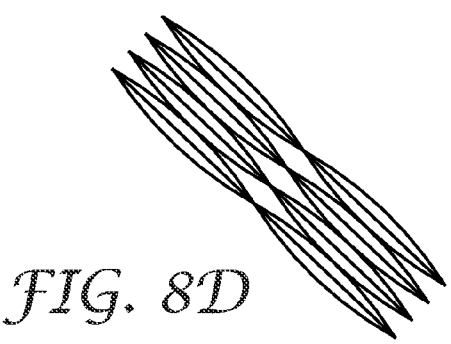
Figure 9A:
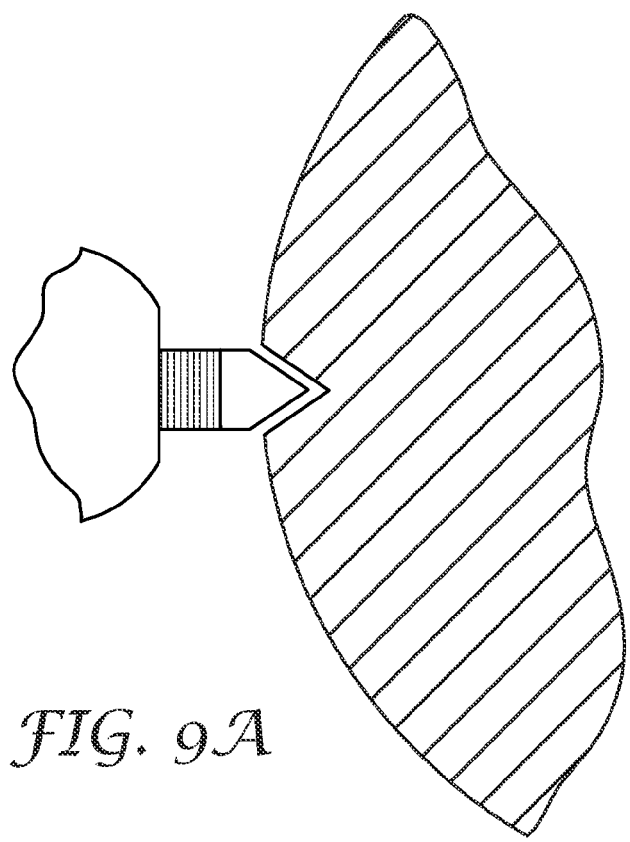
FIG. 9A is a cross-sectional view of a portion of an idealized fly-cutting head with a sharp cutting element cutting a groove or groove segment into a workpiece.
Figure 9B:
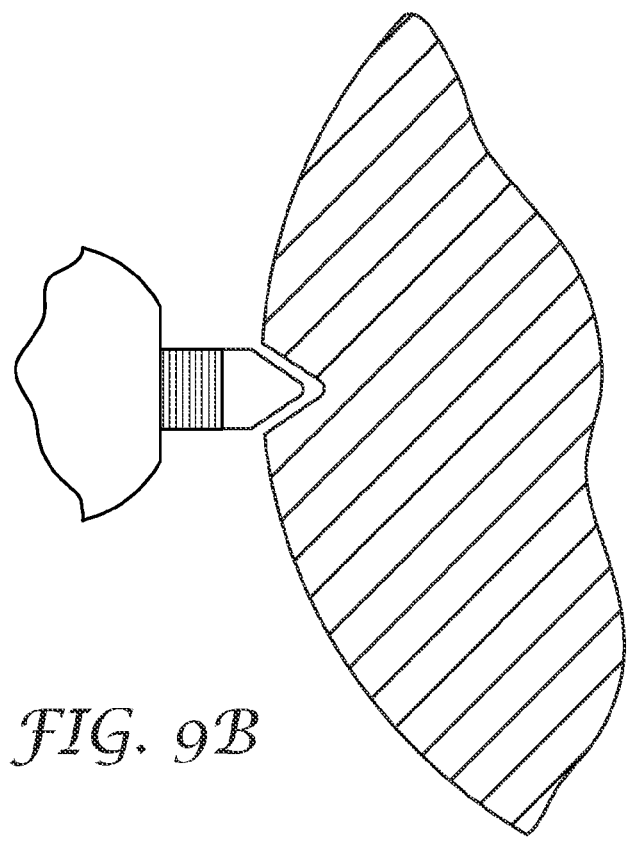
FIG. 9B is a cross-sectional view of a portion of an idealized fly-cutting head with a less sharp or dull cutting element cutting a groove or groove segment into a workpiece.

In one embodiment of the present invention, the fly-cutting head is adapted to move in the Z direction while cutting a single, essentially continuous groove down the length of the roll, or to create one or more other features, either while the roll is stationary or while it is rotating. If the roll is stationary, then at the completion of a single pass down the length of the roll, the roll may be indexed and the process repeated to form an adjacent groove or other set of features, as shown in an exemplary roll 14 in FIG. 7 at 50. In another embodiment, the roll is rotated at a constant angular velocity, and the fly-cutting head is held at essentially the same position along the Z axis while the head cuts features or groove segments that extend in the Z direction into the roll around its perimeter. Because the position of the cutting elements can be controlled relatively precisely, the position of a groove or other feature cut into the roll surface during a second or subsequent revolution of the roll can be coordinated with the position of grooves or other features cut into the roll surface during a preceding revolution, as shown in FIG. 7 at 55. Features 50 and 55 are shown on the same roll for convenience, and although different features may be provided on any given workpiece as shown, normally a roll will have substantially the same features over its length.

It is believed that because cutting elements experience wear, and wear will result in subtle changes in the characteristics of the features cut into a roll, a close inspection of the roll or a workpiece formed on the roll can indicate whether the sequence of groove segments were created along the Z axis of the roll, as noted first above, or along the perimeter, as noted second. In other words, using the Z-axis cutting method described first above, the cutting element(s) would wear as each sequential groove was cut, so that by the time the final groove was cut alongside the first groove, the last groove formed by the worn cutting element may appear noticeably different than the first groove formed by an unworn or less-worn cutting element, at least on a micro-scale. This may be referred to as a "virtual seam," because of the difference between two adjacent grooves or other features. Using the peripheral cutting method described second above, where small individual groove segments are formed around the perimeter of the roll, the features formed by the unworn or less-worn cutting element would be at the first end of the roll, and the features formed by the worn cutting element would appear at the second end of the roll. Rolls having the "virtual seam" and rolls having the "end-to-end" wear patterns described above, as well as the methods of forming them and sheeting or other goods made using them are all within the scope of the present invention.

A microreplication tool according to the present invention may advantageously be made with generally parallel grooves extending not only parallel or perpendicular to the longitudinal axis of the tool, but also at an angle with respect to that axis. For example, "45 degree" tooling, meaning tooling having linear grooves that extend at approximately a 45 degree angle with respect to the axis of rotation of the roll or a major axis of a workpiece, can be used to produce sheeting having grooves or other features cut at the corresponding angle. FIG. 2 illustrates the creation of tooling having grooves that extend at an angle α of approximately 45 degrees relative to the Y axis, in which the fly-cutting head is positioned using a different positioning system than illustrated in FIG. 1. Forming grooves or features in a predetermined pattern in a workpiece at an angle to both the Y and Z axes is more complex than forming them parallel to the Z axis. It is more complex because the fly-cutting head is not simply advanced a fixed distance in the Z direction for each revolution of the workpiece to form the next groove, as with some of the other embodiments noted above. Instead, the Z-direction travel of the fly-cutting head for each rotation of the workpiece should be analytically or experimentally determined, so that on successive rotations of the workpiece subsequent groove segments are aligned with earlier groove segments if aligned groove segments are desired. For example, if a series of 45 degree groove segments are formed around the perimeter of the roll, each be slightly advanced in the Z direction relative to the previous segment, then after a complete revolution of the roll the groove segments formed during a second revolution would be parallel to the ones formed during the first revolution, but not necessarily aligned end-to-end with them. One solution to this problem is to calculate the distance by which, after a complete revolution of the roll, the groove segments formed during a second revolution should be adjusted in order to make them align end-to-end with the segments formed during the first revolution. That distance may then be divided by the number of groove segments formed during a single revolution, and the resulting fraction added to the pitch between each successive groove segment so that after a full revolution of the workpiece, the groove segments formed during the second revolution have effectively precessed by the desired distance with respect to the groove segments formed during the first revolution. The same process can be used with successive revolutions.

Tooling may be created with linear grooves positioned at any angle relative to the workpiece, or with non-linear features or even features that intersect each other. Other angular arrangements are also possible, including sets of parallel grooves cut at different angles to produce prisms or other microstructures on the roll or workpiece surface. The fly-cutting head may be angled with respect to one or more than one of the illustrated axes, and may also or instead be rotated around one or more than one of the axes, so that the cutting elements strike the workpiece in a predetermined position and orientation. For example, the fly-cutting head could be rotated 90 degrees around the X axis relative to FIG. 1, so that it is aligned with the Y axis, and then it could be rotated around the Y axis at for example a 45 degree angle so that the cutting elements strike the workpiece in a certain manner.

The surface features that are cut into a workpiece in accordance with the present invention can be controlled on both a macro-scale and on a micro-scale. Surface features or microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). Alternatively, in other embodiments, the pitch for the microstructures can be greater than 1000 microns. These dimensions are provided for illustrative purposes only, and features or microstructures made using the actuators and system described in the present specification can have any dimension within the range capable of being tooled using the system.

On a large or "macro-" scale, surface features cut into a blank roll or other workpiece may or may not extend uninterrupted across the length, width, or around the perimeter of the workpiece. For example, a series of aligned groove segments can be cut into a roll to provide a microreplication tool on which sheeting may be made having peaks separated by flat areas, or land areas, as in FIG. 7 at 55. Features can be cut into a workpiece, such as a roll, at an angle with respect to the axis of rotation (or an axis of symmetry) of the workpiece, such as at a 45 degree angle to that axis. Multiple features can be cut into a workpiece in successive passes of a fly-cutting head, or multiple features can be cut into a workpiece by successive passes of each cutting element during a single pass (such as a shallower groove cut by one cutting element and a deeper groove cut by the next succeeding cutting element).

On a micro-scale, certain advantages can be obtained by programming the system or the fly-cutting head of the present invention to create individual groove segments having what is termed "x-axis chaos," meaning that sequential movements of the cutting element in the X axis are random. "Chaos" is typically considered to be random movement that is intentionally introduced due to its benefits, whereas "chatter" is typically considered to be a vibrational movement unintentionally created by the system that is undesirable, and that users try to reduce or eliminate.

A certain groove profile may appear to the unaided eye to have a constant shape, but upon closer inspection it may actually have been provided with small-scale geometric variations that are random, pseudo-random, or predetermined. For example, the instructions or signals sent to the actuator may control the actuator in a manner that provides radial control of the cutting element to provide a flat-bottomed groove on a macro-scale, but may in addition introduce a certain degree of X-axis chaos on a micro-scale. This can be useful because optical film made on a microreplication tool made in this manner may redirect or diffuse light, hide defects, or otherwise perform in an advantageous manner.

In another embodiment, the "lead-in" and "lead-out" portions (sometimes referred to as the "taper-in" and "taper-out" portions) of an individual feature or groove can be designed in a predetermined manner to create an overall groove or feature topography that is desired. The taper-in and taper-out angles are the angles at which a cutting tip enters the workpiece and leaves the workpiece, respectively. With the actuators described herein, the taper-in and taper-out portions can be made steeper, shallower, or non-linear as desired, and may even vary from one feature to the next feature in either a random, semi-random, or predetermined manner. The taper-in and taper-out angles cause a sheeting made on the workpiece having features with those angles to have ridges that exhibit approximately those angles, depending on other cutting parameters that influenced the formation of the features.

Sheeting made using the present invention may, for example, include flat-bottomed grooves that are useful for applications in which scallops are not desired or permitted. If X-axis chaos has also been introduced during the tooling process, then the peaks of the sheeting will have a corresponding profile, which is useful for light-spreading, defect hiding, anti-wet-out, and other purposes.

Once a microreplication tool has been formed, it may be used as a master to create microreplicated sheeting, films, or other surface effects on another object. Sheeting may be made using a tool prepared according to the present invention by methods such as casting and curing a polymeric material on the tool, embossing, extrusion, compression molding, and injection molding. Casting-and-curing is generally preferred, and the materials from which the sheeting may be made include polycarbonate and polyethylene terephthalate (PET). The sheeting may include two or more layers, such that a backing layer comprises one material and the grooves or other structures comprise another material. In another embodiment of the present invention, the structure of the tool (a master tool) can be transferred on other media, such as to a belt or web of polymeric material, by a cast and cure process to form a production tool. This production tool is then used to make a microreplicated article of the type described herein. This results in an article having a surface that corresponds to the surface of the master tool. Other methods, such as electroforming, can also be used to copy the master tool. That copy, which may be referred to as an intermediate tool, can then be used to produce the microreplicated article.

Features in the surface of a roll, and accordingly in a film or sheeting made using that roll, can be made so small as to be invisible to the naked eye. Because the surface features on both a roll and the resulting sheeting can be carefully controlled, the performance of light transmitted, reflected, or refracted by the sheeting can also be controlled, which provides various beneficial effects as is known in the art.

FIGS. 8A, 8B, 8C, and 8D illustrate several representative illustrations of grooves or features that may be formed in accordance with the present invention. The features shown in FIG. 8A generally represent individual grooves cut into a workpiece, each aligned with a previous groove so as to approximate a series of continuous linear grooves. The features shown in FIG. 8B generally represent individual grooves cut into a workpiece, in which the grooves are not aligned, and may overlap each other in the longitudinal direction of the groove or the transverse or lateral direction of the groove if it is desirable not to have any land area between grooves. The features shown in FIG. 8C generally represent individual grooves cut into a workpiece, in which one or more actuators caused variations in the position or orientation of the cutting element, such as variations along the X axis. Finally, the features shown in FIG. 8D generally represent individual grooves cut into a workpiece, each aligned with a previous groove so as to approximate a series of continuous linear grooves, wherein the grooves extend at a 45 degree angle with respect to the axis of rotation of the workpiece. These grooves may also be designed so that they overlap each other in the longitudinal direction of the groove, for example to create a continuous bottom of the groove, or in the lateral or transverse direction of the groove(s). Organized or random patterns of grooves may be provided in keeping with the teachings of the present invention.

Various aspects of the present invention are described as though no features had previously been formed in a workpiece, but the present invention may be used to modify, supplement, or complement features that have been previously been formed in a workpiece. The features may have been formed by other milling, turning, or fly-cutting operations, or any other surface formation or deformation methods now known or later developed. For example, workpieces are sometimes formed with very small pyramids on their surfaces, which can facilitate the formation of polymeric sheeting with the inverse of those pyramids—cube corners—that can reflect incident light. Those pyramids may be formed by three successive passes of a fly-cutting device, any one or more of which may include aspects of the present invention. It may also be useful to perform additional cutting, milling, or other processes to remove or deform material, or refine surface features, following the fly-cutting operations described herein.

The ability to form grooves at an angle with respect to the longitudinal axis of a cylindrical workpiece is an advantage relative to conventional cylindrical tools that include essentially linear grooves parallel or perpendicular to the longitudinal axis of the tool. This is because a user who wishes to use sheeting so that the grooves are at a 45 degree angle relative to the sides of the sheet would normally need to die-cut that sheeting at an angle from a larger piece of sheeting having grooves extending longitudinally or laterally. This can result in significant waste near the sides of the larger piece of sheeting. With the present invention, sheeting having grooves extending at a 45 degree angle (or any other selected angle) relative to the sides of the sheeting can be directly formed on a tool, with minimal waste along the sides of the sheeting when the sheeting is cut for use.

Sheeting according to the present invention, including optical film, is useful in a variety of applications. Microreplicated structures such as sheeting have been used for retroreflective road signs and license plates for vehicles, for displays such as the displays in portable computers to control the emission of light toward the viewer, other optical films, abrasive or friction-control films, adhesive films, mechanical fasteners having self-mating profiles (as disclosed in U.S. Pat. No. 5,360,270, for example), or any molded or extruded parts having microreplicated features of relatively small dimensions, such as dimensions less than approximately 1000 microns.

In other embodiments of the invention, the cutting elements need not project radially from the fly-cutting head as with conventional fly-cutting heads. Instead or in addition, the cutting elements could extend parallel or generally parallel to the axis of rotation of the fly-cutting head. The cutting elements can be controlled by actuators in the manner described above, and used in an operation referred to as "face-cutting" or "face fly-cutting" to cut certain patterns or features into the surface of a workpiece. In this embodiment, the cutting elements are essentially in continuous contact with the workpiece, not intermittent contact as is normally the case with conventional fly-cutting.

The present invention has now been described and illustrated with respect to several embodiments thereof. The invention is not limited to those embodiments, but only by the terms of the following claims, and their equivalents.

We claim:

1. A fly-cutting apparatus comprising:
   a motorized spindle for supporting and rotating a workpiece according to command signals from a control system;
   a rotatable shaft that is continuously rotatable about an axis of rotation; and
   a continuously rotatable fly-cutting head that is mounted to the rotatable shaft, wherein the fly-cutting head includes:
      a first tool holder for securing a first device to the fly cutting head, wherein the first device is adapted to deform or remove material from a workpiece;
      a first dynamically-controllable actuator, positioned between the axis of rotation at the head and the first tool holder and radially spaced from the axis of rotation, that creates motion that changes the radial position of the first tool holder in response to the command signals from the control system, relative to the axis of rotation of the rotatable shaft during a cutting operation such that the first tool holder traces a first controllable, predetermined cutting path relative to the position and rotation of the workpiece, wherein the first actuator can vary a depth of the first device by varying the radial position of the first tool holder while the first device is forming one or more features in the workpiece by deforming or removing material from the workpiece;
   a second tool holder for securing a second device to the fly cutting head, wherein the second device is adapted to deform or remove material from the workpiece; and
   a second dynamically-controllable actuator, positioned between the axis of rotation at the head and the second tool holder and radially spaced from the axis of rotation, that creates motion that changes the radial position of the second tool holder in response to the command signals from the control system, relative to the axis of rotation of the rotatable shaft during the cutting operation such that the second tool holder traces a second controllable, predetermined cutting path relative to the position and rotation of the workpiece, wherein the second actuator can vary a depth of the second device by varying the radial position of the second tool holder while the second device is forming one or more features in the workpiece by deforming or removing material from the workpiece, and
   a third dynamically-controllable actuator, positioned between the head and the first tool holder, wherein the third actuator can vary position of the first tool holder along a different axis than the first actuator.

2. The fly-cutting apparatus of claim 1, wherein the first actuator changes the position of the first tool holder relative to the rotatable shaft based on the rotational position of the fly-cutting head.

3. The fly-cutting apparatus of claim 1, wherein the first actuator changes the position of the first tool holder according to the position of the first tool holder relative to the workpiece.

4. The fly-cutting apparatus of claim 1, further comprising a cutting element, wherein the cutting element is secured to the fly-cutting head by the first tool holder, wherein the first tool holder is adapted to reposition the cutting element radially with respect to the rotational axis of the head.

5. The fly-cutting apparatus of claim 1, further comprising a cutting element, wherein the cutting element is secured to the fly-cutting head by the first tool holder, wherein the first actuator changes the cutting radius of the cutting element relative to the rotational axis of the head.

6. The fly-cutting apparatus of claim 1, wherein the first actuator is activated in response to an electrical signal.

7. The fly-cutting apparatus of claim 1, wherein the first actuator comprises a piezoelectric stack.

8. The fly-cutting apparatus of claim 1, wherein the first actuator is a component of a fast-tool servo that further comprises a feedback system.

9. The fly-cutting apparatus of claim 1, further comprising a cutting element, wherein the cutting element is secured to the fly-cutting head by the first tool holder, wherein the first actuator changes the position of the cutting element in a random manner according to signals transmitted by the control system.

10. The fly-cutting apparatus of claim 1, further comprising a cutting element, wherein the cutting element is secured to the fly-cutting head by the first tool holder, wherein the first actuator changes the position of the cutting element according to a repeated random profile according to signals transmitted by the control system.

11. The fly-cutting apparatus of claim 1, further comprising a cutting element, wherein the cutting element is secured to the fly-cutting head by the first tool holder, wherein the first actuator changes the position of the cutting element according to a predetermined profile according to signals transmitted by the control system.

12. The fly-cutting apparatus of claim 11,
   wherein the predetermined profile is a predetermined profile during a single pass of the cutting element relative to the workpiece, and
   wherein the predetermined profile during the during single pass of the cutting element yields a groove in the workpiece with a substantially linear bottom as measured in a direction parallel to a rotational plane of the cutting element.

13. The fly-cutting apparatus of claim 1, in combination with an encoder for detecting changes in the angular position of the head.

14. The fly-cutting apparatus of claim 13, wherein the encoder is a rotary encoder that detects an angular position of the shaft.

15. The fly-cutting apparatus of claim 13, wherein the encoder is adapted to transmit a signal indicative of the angular position of the head to the control system.

16. The fly-cutting apparatus of claim 1 or claim 15, in combination with the control system.

17. The fly-cutting apparatus of claim 16, wherein the control system sends a signal to the first actuator to control the first actuator.

18. The fly-cutting apparatus of claim 17, wherein the control system transmits signals to the first actuator to effectuate macro-position control.

19. The fly-cutting apparatus of claim 18, wherein the macro-position control causes the first cutting path to include an essentially straight portion by varying a cutting radius of the first tool holder during the formation of a groove segment in a workpiece.

20. The fly-cutting apparatus of claim 17, wherein the control system transmits signals to the first actuator that effectuate micro-position control.

21. The fly-cutting apparatus of claim 20, wherein the micro-position control comprises x-axis chaos.

22. The fly-cutting apparatus of claim 1, in combination with a cutting element.

23. The fly-cutting apparatus of claim 1, in combination with at least two cutting elements.

24. The fly-cutting apparatus of claim 23, wherein one cutting element is secured to the fly-cutting head by the first tool holder and is dynamically-controlled by the first actuator, and a second cutting element is held at a fixed position relative to the fly-cutting head.

25. The fly-cutting apparatus of claim 23, wherein the cutting elements are evenly spaced with respect to a rotational axis of the head.

26. The fly-cutting apparatus of claim 1, further comprising an electric motor for driving the rotatable shaft.

27. The fly-cutting apparatus of claim 1, wherein the first actuator changes the position of the first tool holder relative to the rotatable shaft by pivoting the first tool holder relative to the rotatable shaft.

28. The fly-cutting apparatus of claim 1, wherein the rotatable shaft and the first tool holder operate at rotational speeds between about 1000 revolutions per minute and about 100,000 revolutions per minute during the cutting operation.

29. The fly-cutting apparatus of claim 28, wherein the motorized spindle operates at rotational speeds between about 0.001 revolutions per minute and about 1000 revolutions per minute during the cutting operation.

30. A method of machining a workpiece using a fly-cutting apparatus according to claim 1, the method comprising the step of transmitting a signal to the first actuator from the control system, wherein the signal is adapted to mitigate a hysteresis effect associated with the first actuator.

31. A method of machining a workpiece, comprising the steps of:
(a) providing a fly-cutting apparatus according to claim 1, the fly-cutting head adapted for rotation relative to a fixed support; and
(b) transferring from the fixed support to the fly-cutting head at least one of (i) power, for activating the first actuator, and (ii) the command signals from the control system, for activating the first actuator.

32. The method of claim 31, wherein step (b) includes the use of a slip ring.

33. A fly-cutting apparatus comprising:
a motorized spindle for supporting and rotating a workpiece according to command signals from a control system;
a rotatable shaft that is continuously rotatable about an axis of rotation; and a continuously rotatable fly-cutting head that is mounted to the rotatable shaft, wherein the fly-cutting head includes:
a first cutting element; and
a first dynamically-controllable actuator, positioned between the axis of rotation at the head and the first tool holder and radially spaced from the axis of rotation, that creates motion that changes the radial position of the first cutting element in response to the command signals from the control system, relative to the axis of rotation of the rotatable shaft during a cutting operation such that the first cutting element traces a first controllable, predetermined cutting path relative to the position and rotation of the workpiece, wherein the first actuator can vary a depth of the first cutting element by varying the radial position of the first cutting element while the first cutting element is forming one or more features in the workpiece by deforming or removing material from the workpiece;
a second cutting element; and a second dynamically-controllable actuator, positioned between the axis of rotation at the head and the second tool holder and radially spaced from the axis of rotation and the second cutting element, that creates motion that changes the radial position of the second cutting element in response to the command signals from the control system, relative to the axis of rotation of the rotatable shaft during the cutting operation such that the second cutting element traces a second controllable, predetermined cutting path relative to the position and rotation of the workpiece, wherein the second actuator can vary a depth of the second cutting element by varying the radial position of the second cutting element while the second cutting element is forming one or more features in the workpiece by deforming or removing material from the workpiece, and
a third dynamically-controllable actuator, positioned between the head and the first tool holder, wherein the third actuator can vary position of the first tool holder along a different axis than the first actuator.

34. The fly-cutting apparatus of claim 33, wherein the first actuator changes the position of the first cutting element relative to the rotatable shaft based on the rotational position of the fly-cutting head.

35. The fly-cutting apparatus of claim 33, wherein the first actuator changes the position of the first cutting element according to the position of the first cutting element relative to the workpiece.

36. The fly-cutting apparatus of claim 33, wherein the first actuator changes the cutting radius of the first cutting element relative to the rotational axis of the head.

37. The fly-cutting apparatus of claim 33, further comprising an electric motor for driving the rotatable shaft.

38. The fly-cutting apparatus of claim 33, wherein the first actuator changes the position of the first cutting element relative to the rotatable shaft by pivoting the first cutting element relative to the rotatable shaft.

39. The fly cutting apparatus of claim 33, further comprising a third cutting element, wherein the third cutting element is a fixed position cutting element mounted to the fly cutting head.

40. The fly-cutting apparatus of claim 33, wherein the rotatable shaft and the continuously rotatable fly-cutting head operate at rotational speeds between about 1000 revolutions per minute and about 100,000 revolutions per minute during the cutting operation.

41. The fly-cutting apparatus of claim 40, wherein the motorized spindle operates at rotational speeds between about 0.001 revolutions per minute and about 1000 revolutions per minute during the cutting operation.

42. The fly-cutting apparatus of claim 33,
wherein the first actuator changes the position of the first cutting element during a single pass of the cutting element relative to the workpiece according to a predetermined profile according to the command signals transmitted by the control system, and wherein the predetermined profile during the during single pass of the first cutting element yields a groove in the workpiece with a substantially linear bottom as measured in a direction parallel to a rotational plane of the first cutting element.

* * * * *

UNITED STATES PATENT AND TRADEMARK OFFICE
CERTIFICATE OF CORRECTION

PATENT NO. : 9,180,524 B2  
APPLICATION NO. : 11/834393  
DATED : November 10, 2015  
INVENTOR(S) : Alan Campbell et al.

It is certified that error appears in the above-identified patent and that said Letters Patent is hereby corrected as shown below:

In The Claims

Col. 21, lines 66-67, in Claim 33, delete "first tool holder" and insert -- first cutting element --.

Col. 22, lines 15-17, in Claim 33, delete "second tool holder and radially spaced from the axis of rotation and the second cutting element," and insert -- second cutting element and radially spaced from the axis of rotation, --.

Signed and Sealed this  
Nineteenth Day of April, 2016

Michelle K. Lee  
*Director of the United States Patent and Trademark Office*